May 19, 1953  G. E. DATH  2,638,853
SNUBBING MEANS FOR RAILWAY CAR TRUCK SPRINGS
Filed Feb. 27, 1950  2 Sheets—Sheet 1

Inventor
George E. Dath.
By Henry Fuchs
Atty.

May 19, 1953  G. E. DATH  2,638,853
SNUBBING MEANS FOR RAILWAY CAR TRUCK SPRINGS
Filed Feb. 27, 1950  2 Sheets-Sheet 2

Inventor:
George E. Dath.
By Henry Fuchs
Atty.

Patented May 19, 1953

2,638,853

UNITED STATES PATENT OFFICE 2,638,853

SNUBBING MEANS FOR RAILWAY CAR TRUCK SPRINGS

George E. Dath, Mokena, Ill., assignor to W. H. Miner, Inc., Chicago, Ill., a corporation of Delaware Application February 27, 1950, Serial No. 146,538

2 Claims. (Cl. 105—197)

1

This invention relates to improvements in friction means for snubbing or dampening the action of truck springs of railway cars.

One object of the invention is to provide in a railway car truck, means for snubbing the action of the truck springs, comprising relatively laterally separable side members having their outward movement resisted by rubber cushioning elements buttressed against the truck side frame, and a top spring follower plate supported on the truck springs and bearing on the underneath side of the truck bolster, wherein the spring follower plate has sliding frictional engagement with the side members on inclined faces to spread the same apart against the rubber cushioning elements.

Other objects of the invention will more clearly appear from the description and claims hereinafter following.

Figure 1:
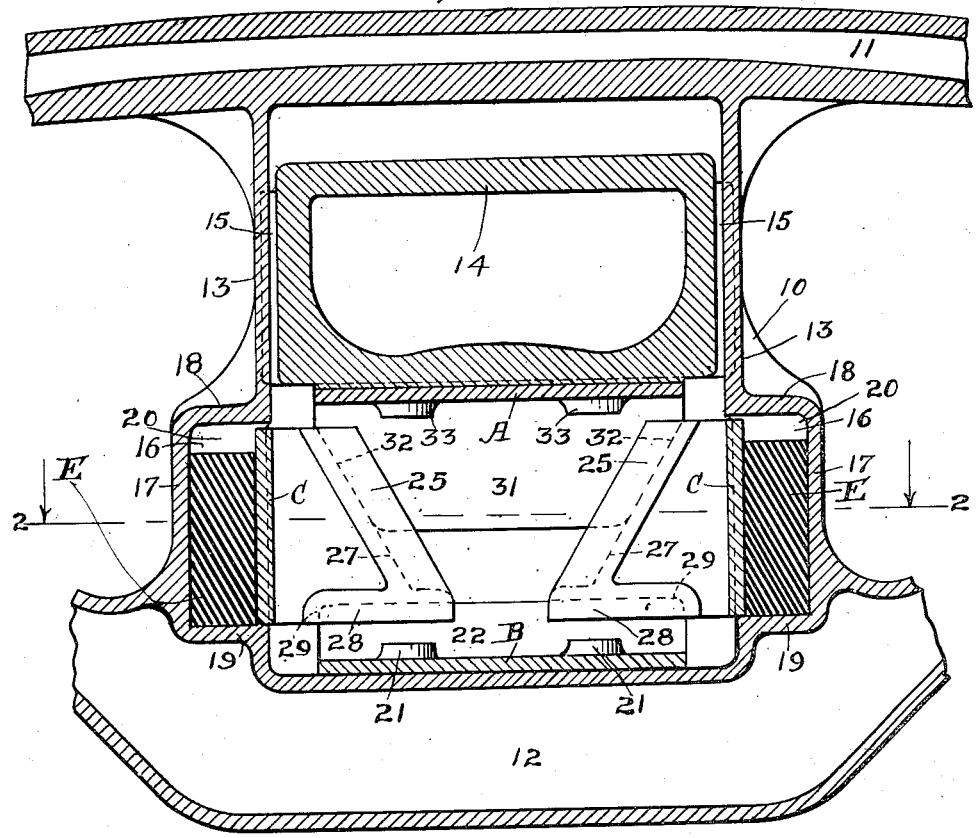
Figure 2:
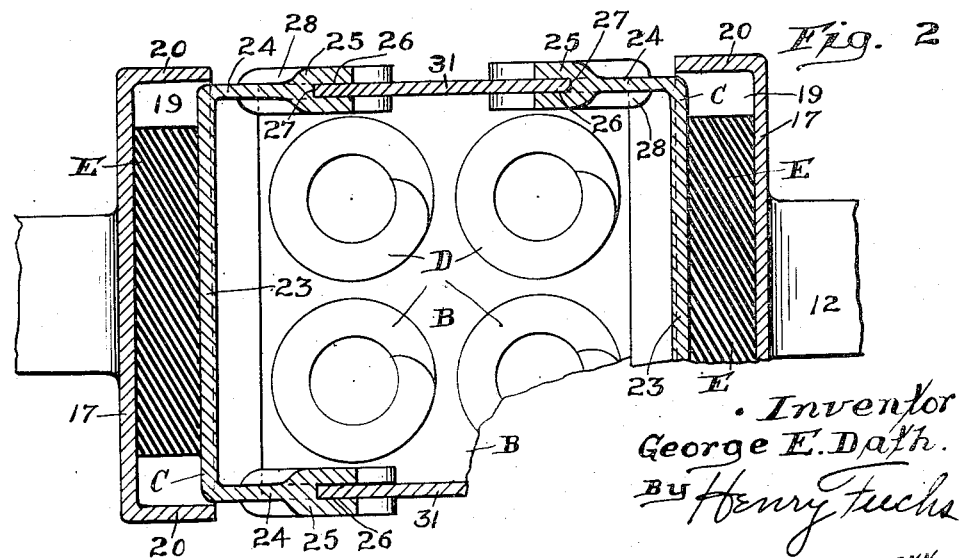
Figure 3:
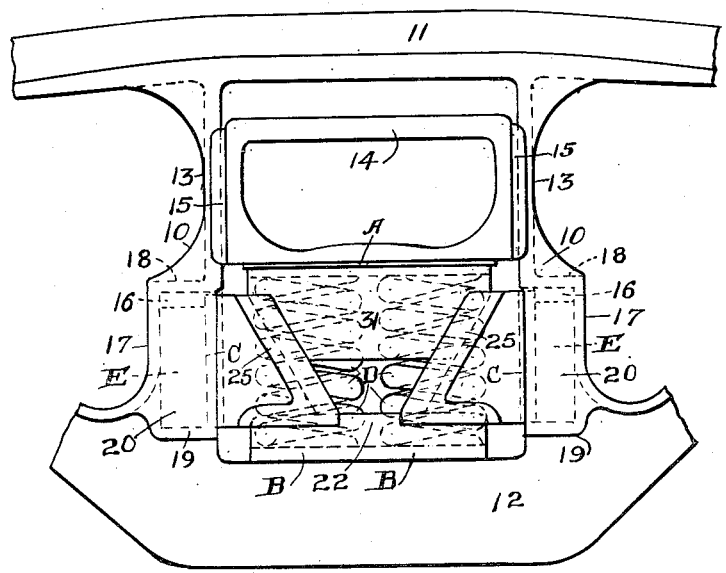
Figure 4:
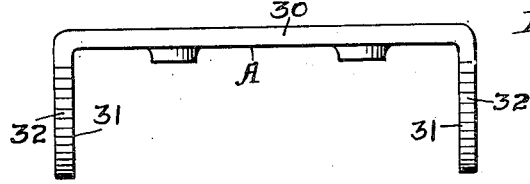
Figure 5:
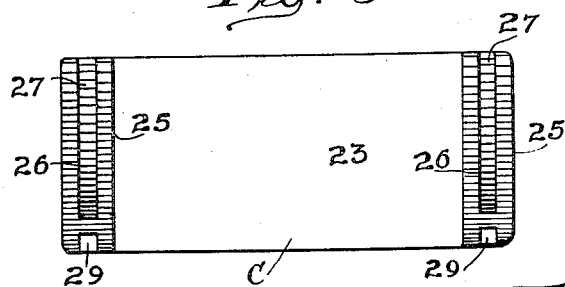
Figure 6:
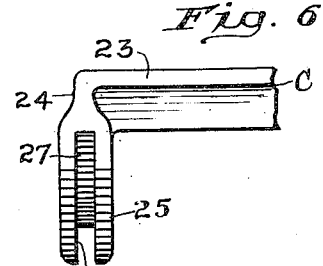
Figure 7:
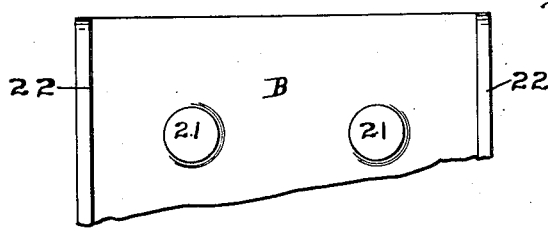

In the accompanying drawings forming a part of this specification, Figure 1 is a longitudinal, vertical sectional view, partly broken away, of a truck side frame and the cooperating bolster of a railway car truck, with the truck springs omitted. Figure 2 is a horizontal sectional view, partly broken away, corresponding substantially to the line 2—2 of Figure 1, with the truck springs shown in plan. Figure 3 is a side elevational view, on a reduced scale, of the truck side frame shown in Figure 1. Figure 4 is an end elevational view of the top spring follower plate shown in Figure 1, looking from left to right in said figure. Figure 5 is an elevational view of the side member at the right hand side of Figure 2, looking from left to right in said figure. Figure 6 is a top plan view of the right hand end portion of the structure shown in Figure 5. Figure 7 is a top plan view, partly broken away, of the bottom spring follower plate shown in Figure 2.

In said drawings, 10 indicates one of the side frame members of a railway car truck. The side frame member 10 is of the usual well-known design, having top and bottom, horizontal members 11 and 12, connected by vertically disposed sections 13—13. As will be understood by those skilled in this art, the truck includes two side frame members 10—10, a truck bolster 14 supported by the truck springs, mounted in the side frames at opposite sides of the truck. As shown in Figures 1 and 3, the vertical sections 13—13 of each side frame present guides 15—15 at opposite sides of the bolster 14 on which the latter is vertically slidable.

As shown in the drawings, my improved snubbing means is in the form of a unit mounted in each truck side frame member, and each unit comprises broadly a top spring follower plate A, a bottom spring follower plate B, a pair of side members C—C, a truck spring cluster D, and a pair of rubber pads E—E.

In carrying out my invention, as illustrated in the drawings, I provide inwardly opening pockets 16—16 in the lower portions of each side frame member, at opposite sides of the spring space of said side frame member. Each pocket 16 is defined by a vertical back wall 17, horizontal top and bottom walls 18 and 19, and vertical side walls 20—20.

The bottom spring follower plate B rests on the horizontal bottom wall 19 of the side frame and supports the spring cluster D, which, as shown, is composed of four coil spring units. The follower plate B is provided with the usual upstanding spring centering projections 21—21, which are engaged in the bottom ends of the springs of the cluster D. At opposite ends, the spring follower plate B is provided with transversely extending, upturned, right angular flanges 22—22, which form guides for the side members C—C.

The two side members C—C are of similar design, and are arranged respectively at opposite sides of the spring opening of the side frame. Each side member C comprises a transversely extending, vertical plate section 23, having right angular, inwardly projecting wing portions 24—24 at opposite ends. The inner edge of each wing portion 24 is inclined upwardly and outwardly toward the corresponding vertical section 13 of the side frame, the inclined edge portion being thickened, as indicated at 25, and vertically grooved to provide a guideway 26, presenting an inclined back wall providing a friction surface or wedge surface 27. Each side member C projects into the pocket 16 at the corresponding side of the side frame and is guided for horizontal movement on the bottom wall 19 of said pocket and the corresponding flange 22 of the bottom spring follower plate B, the lower edge of each wing portion 24 being provided with a thickened section 28, which has a horizontal guide groove 29 formed therein for said flange 22. The interengaged flanges 22—22 and grooves 29—29 of the bottom spring follower plate and the side members C—C prevent relative displacement of the members C—C and the bottom spring follower plate B transversely of the side frame, in addition to guiding the side members for lateral sliding movement. As will be evident, upon reference to Figure 2, each side member C is held against displacement transversely of the corresponding side frame by wing portions 24—24 thereof, which are guided between the side walls 20—20 of the corresponding pocket 16.

The rubber pads E—E are in the forms of rectangular blocks arranged within the pockets 16—16 of each bolster, between the platelike sections 23—23 of the side members C—C and the back walls 17—17 of said pockets, respectively. As will be evident, the pads E—E yieldingly oppose lateral separation or spreading apart of the side members C—C.

The top spring follower plate A comprises a central, platelike section 30 bearing on the underneath side of the bolster 14 and supported on the spring units of the spring cluster D, and depending right angular flanges or sections 31—31 at opposite ends of said plate like section. The flange sections 31—31 are tapered downwardly, as shown, that is, the side edges of the same converge downwardly, thereby providing wedge faces or surfaces 32—32. The tapered flange section 31 at each end of the spring follower plate A forms a wedge-shaped projection, which is guided in the guideways 26—26 of the wing portions 24—24 at the corresponding ends of the two side members C—C, with the wedge faces 32—32 in wedging engagement with the wedge surfaces 27—27 of said wing members. The spring follower plate A is also provided with the usual centering projections 33—33 for the springs of the cluster D.

The operation of my improved snubbing means is as follows: Upon relative approach of the truck bolster and the bottom members 12—12 of the side frames of the truck, the coils of each spring cluster D are compressed between the top and bottom spring follower plates A and B, and the side members C—C are wedged apart by the wedge projections of the spring follower plate A, and forced against the rubber pads E—E to compress the latter. Due to the friction created between the wedge faces of the respective projections of the plate A, and the wings 24—24 of the side members C—C, and the resistance afforded by the rubber pads E—E, the actions of the spring cluster D are effectively snubbed.

I claim:

1. In a railway car truck, the combination with side frames provided with bolster guides, a truck bolster, and a spring cluster supporting said bolster on each side frame; of pockets in each side frame at opposite sides of the corresponding spring cluster, each pocket having a vertical inner wall; a rubber pad in each pocket buttressed against the inner wall thereof; laterally separable side members supported by each of said side frames at opposite sides of said spring cluster of said side frame, each side member including a platelike section bearing on the corresponding rubber pad, and flanges at opposite ends of said plate section extending inwardly therefrom and embracing said spring cluster therebetween; a top spring follower plate supported on said spring cluster and bearing on the underneath side of the bolster; and depending flanges on said top spring plate in wedging engagement with said first named flanges, said first and second named flanges having interengaging guide portions of tongue and groove formation.

2. In a railway car truck, the combination with side frames provided with bolster guides, a truck bolster, and a spring cluster supporting said bolster on each side frame; of pockets in each side frame at opposite sides of the corresponding spring cluster; a rubber pad in each pocket; laterally separable side members at opposite sides of said spring cluster of each side frame, each side member including a platelike section bearing on the corresponding rubber pad, and flanges at opposite ends of said plate section extending inwardly therefrom and embracing said spring cluster therebetween; a bottom spring follower plate supporting the spring cluster of each side frame on said frame; upstanding guide flanges at opposite ends of said bottom spring plate; a top spring follower plate supported on said spring cluster and bearing on the underneath side of the bolster; and depending flanges on said top spring follower plate in wedging engagement with said flanges of said plate sections, said flanges of said plate sections and said flanges of said top and bottom spring follower plates having interengaging guide portions of tongue and groove formation.

GEORGE E. DATH.

References Cited in the file of this patent

UNITED STATES PATENTS

| Number | Name | Date |
| --- | --- | --- |
| 2,366,973 | Light | Jan. 9, 1945 |
| 2,367,510 | Light | Jan. 16, 1945 |